Aug. 14, 1945.  H. H. BUTTNER  2,382,380
TOASTING DEVICE
Filed Aug. 13, 1942

INVENTOR.
HAROLD H. BUTTNER
James N. Curtin
ATTORNEY.

Patented Aug. 14, 1945

2,382,380

UNITED STATES PATENT OFFICE 2,382,380

TOASTING DEVICE

Harold H. Buttner, Rye, N. Y.

Application August 13, 1942, Serial No. 454,647

1 Claim. (Cl. 99—389)

This invention relates to toasting apparatus and in particular to an adapter or container for holding dry breakfast cereals, or the like, while being heated in a household bread toaster.

It is well known that many breakfast cereals are purchased in sealed waxed paper containers for the purpose of maintaining their freshness until used. However, when the containers are once opened there is a tendency for the cereals to absorb a certain amount of moisture with the result that their original crispness is impaired. The purpose of the present invention is to devise means for restoring the crispness of cereals and the like by providing an inexpensive container that can be used in conjunction with ordinary household toasters. It is the further purpose of this invention to devise a means for quickly preparing a heated dry cereal.

Figure 1:
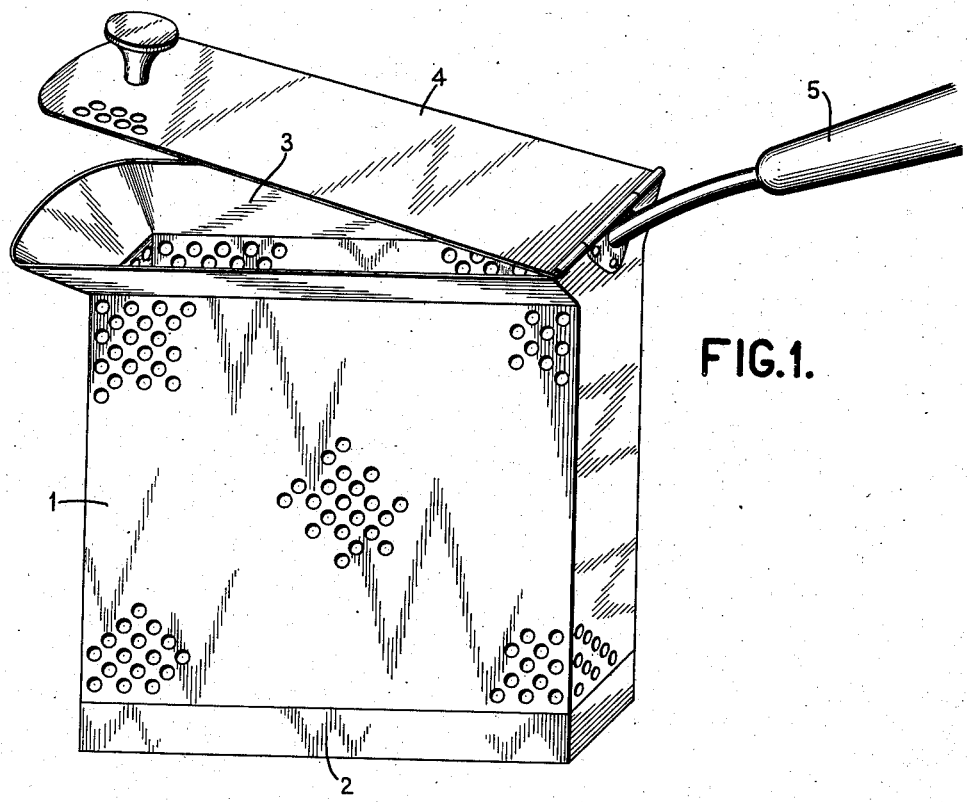
Figure 2:
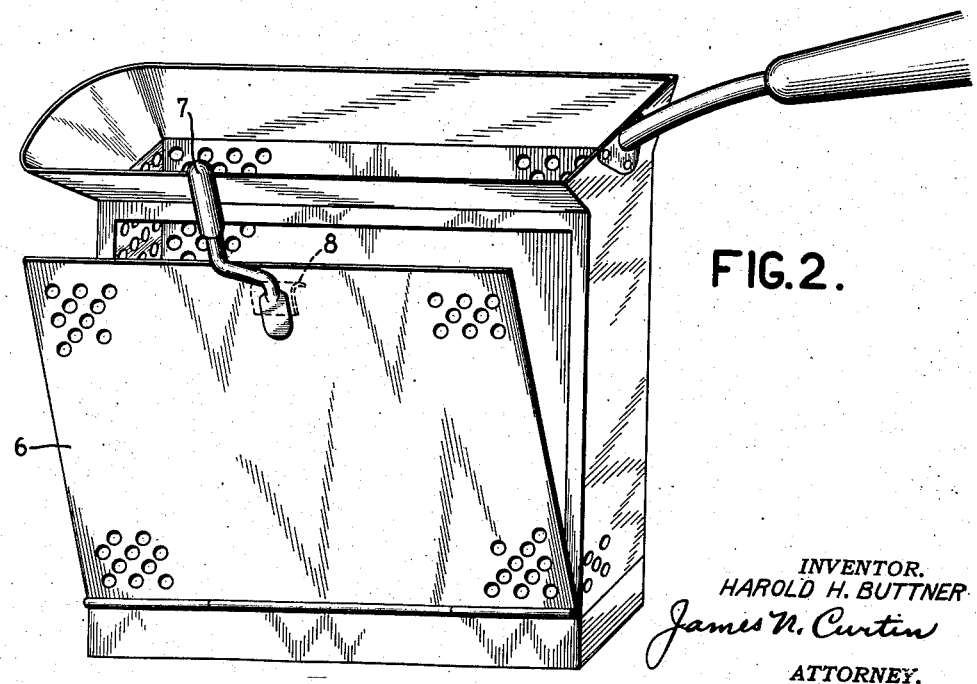

Figs. 1 and 2 of the drawing of this specification show two forms of containers in accordance with this invention.

Fig. 1 shows an adapter 1 fabricated from perforated sheet metal and formed so as to fit into the bread slot of a toaster. Although perforated metal is illustrated in the figure, either heavy screen mesh, expanded metal, or the like could be used. The bottom of the container 2 is preferably constructed of solid material in order that small bits of cereal will not fall through the container and into the toaster. The upper portion of the container 3 is flared outwardly to facilitate the filling of it with cereal.

If the toaster is of the automatic type in which the toast is automatically ejected when completed it may be desirable to hinge a lid 4 to the top of the container for preventing the cereal being thrown therefrom.

A suitable insulating handle 5 is fastened to the container to facilitate handling.

Fig. 2 shows an alternate form of container in which a side 6 thereof is hinged. This permits the container to be conveniently opened for cleaning purposes and also permits the cereal to be placed in the container more conveniently. An insulated handle 7 and spring catch 8, fastened to the upper part of the hinge section, permits the opening and closing of the hinged section.

By reason of this construction of the container wherein it is made generally in the shape of a square prism with thin perforated side walls, and the end walls are made relatively very narrow in comparison with the relatively large and generally square walls, there is provided a narrow space which readily fits within the bread slot of the toaster so that all of the food or cereal placed within the container quickly receives heat throughout and the moisture required to be driven off to crisp the food is readily dissipated and drawn off from all parts of the food.

It is obvious that modifications other than those shown may be incorporated in the design of the container. For example, a double container could be formed which could be simultaneously placed in the double bread slots of a double toaster.

Having thus described my invention, I claim:

A device for heating dry cereal for use with an electric toaster of the kind having a bread slot, comprising a cereal container in the shape of a rectangular prism having overall dimensions substantially corresponding to the dimensions of a slice of bread and having an open top provided with a flared extension, a closed bottom and perforated side walls, and further comprising a handle secured to the flared extension on the top of the container for facilitating removal of the container from the bread slot of an electric toaster.

HAROLD H. BUTTNER.